Fig. 3

Jan. 29, 1963　　　　G. W. CLEVERSEY　　　　3,075,210
　　　　　　　　　　　SHOE HOLDING JACKS

Filed April 7, 1961　　　　　　　　　　　　12 Sheets-Sheet 5

G. W. CLEVERSEY

3,075,210

SHOE HOLDING JACKS

Filed April 7, 1961

Jan. 29, 1963  G. W. CLEVERSEY  3,075,210
SHOE HOLDING JACKS

Filed April 7, 1961  12 Sheets-Sheet 12

United States Patent Office 3,075,210
Patented Jan. 29, 1963

3,075,210
SHOE HOLDING JACKS
Gerald W. Cleversey, Topsfield, Mass., assignor to United Shoe Machinery Corporation, Boston, Mass., a corporation of New Jersey
Filed Apr. 7, 1961, Ser. No. 101,481
11 Claims. (Cl. 12—17.2)

This invention relates generally to machines for performing an operation upon the periphery of a shoe. More particularly the invention is directed to a jack for holding a shoe in a machine such as that disclosed in an application for United States Letters Patent Serial No. 28,800, filed May 12, 1960 (now United States Letters Patent No. 3,019,461, granted February 6, 1962), in the name of Paul Senfleben.

In the use of such a machine, a shoe to be operated upon is presented to a cutter head upon a jack which is oscillated with a stroke that is variable according to the size of the shoe which is also being rotated upon the jack. The cutter head is constantly biased into engagement with the shoe and under the guidance of the shoe has such shoe following movements directed toward and away from the jack as are necessary to cause continuous contact between the shoe and the cutter head to be maintained.

The oscillatory and rotative movements of the jack are so combined that the direction of movement of the shoe at the point where it is operated upon by the cutter head always conforms as nearly as possible to the direction of the sole edge at this point. Moreover, the shoe at the point being operated upon also is moved as nearly normal as possible to the following movement of the cutter head for the purpose of minimizing movement of the cutter head as well as variations in bearing pressure against the shoe. The foregoing motions are obtained by a jack design predicated upon the fact that the shoe is centered upon the jack with the midpoint of the shoe bottom at the axis of rotation of the jack. Provision has been made in the machine disclosed in the above-mentioned patent application for centering a shoe by means which cooperate with special size indicating means on the lasts in the shoes to be operated upon to register the midpoint of the bottom of the shoe of any size with the axis of rotation of the jack. However, such a jack is limited to use with special lasts having size indicating surfaces thereon.

Therefore, it is an object of the invention to provide a jack having means to center any type of shoe upon the axis of rotation of the jack. To this end the jack is provided with gages engageable with the opposite ends of a shoe of any size to be operated upon. The means are interconnected and automatically movable toward each other with the gages remaining equidistant from the axis of rotation of the jack so as to center the shoe with respect to said axis.

In the above-mentioned machine the jack is rotatably mounted upon an oscillating swing arm and provision is made for varying the amplitude of oscillation of the swing arm in accordance with the size of the shoe to be operated upon by automatic adjustment of a fulcrum for a lever in the operating mechanism for the swing arm. Accordingly, a further feature of the invention also utilizes the shoe centering gages to measure the shoe and to control the amplitude of oscillation of the jack in accordance with the shoe centering and measuring movements of the gages.

The above and other objects and features of the invention together with novel details of construction and combinations of parts will now be described with reference to the accompanying drawings and thereafter particularly set forth in the appended claims.

Figure 1:
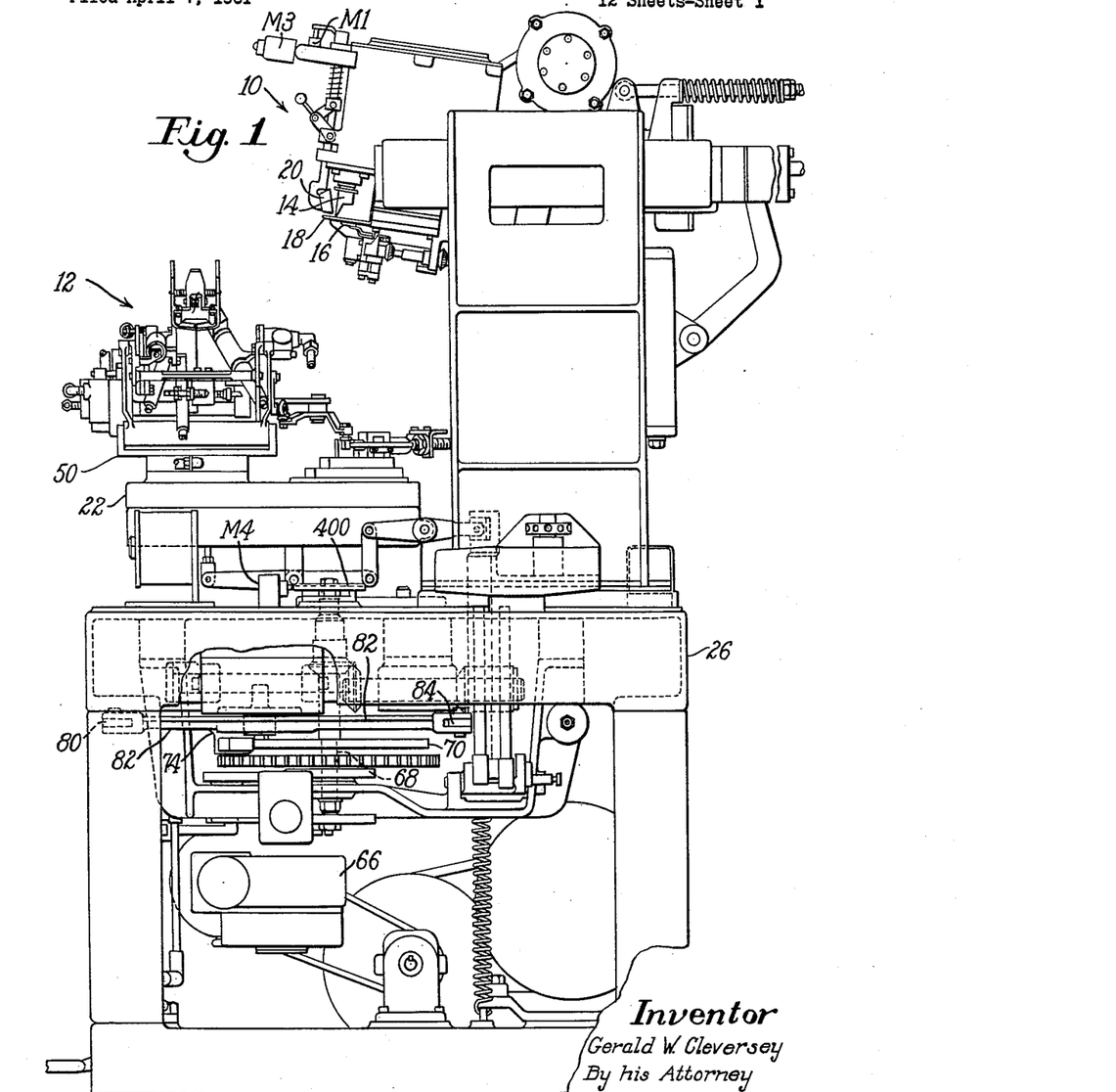
FIG. 1 is a side elevation of an illustrative machine having a shoe jack embodying the present invention.

The machine includes a cutter head 10 which normally is in an inoperative position, as illustrated in FIG. 1, retracted from a jack 12 adapted to hold a lasted shoe upon which a sole rounding operation is to be performed. The illustrated cutter head 10 is substantially the same as that disclosed in the above noted application and has a chopping knife 14 which cooperates, in shearing relation, with an anvil 16 which is fixed upon the cutter head. The rounding cut is made under the control of a gage 18, the forward end of which bears against the side of the shoe upper contiguous to the welt crease when the cutter head is in operative relation to the work and, at this time, the upper surface of the welt is seated upon the upper sides of the gage and anvil. A yieldingly mounted bottom rest 20 rolls upon the bottom of the sole adjacent to the knife and urges the upper surface of the welt against the gage 18 and anvil 16.

The jack 12 is rotatably mounted upon the forward portion of a swing arm 22 having at the rear thereof a sleeve 24 (FIG. 2) which is mounted to oscillate about a vertical axis in the base 26 of the machine. One complete transfer of the point of operation of the cutter head upon the shoe about its periphery is effected by simultaneously rotating the jack counterclockwise through one revolution upon the arm 22 and oscillating the arm back and forth.

Figure 4:
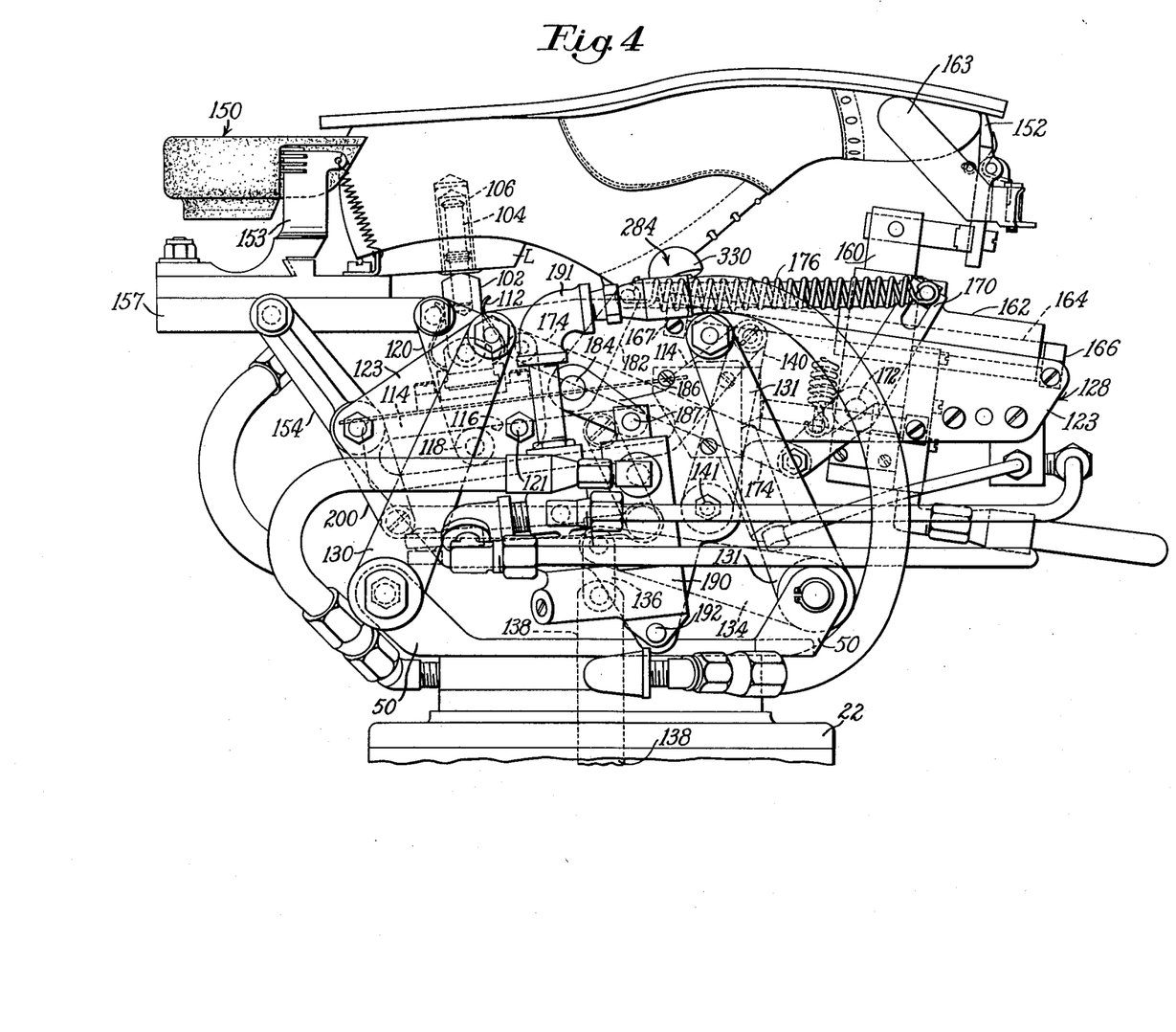
FIG. 4 is a side elevation of the jack shown in FIG. 3.

The jack 12 has a base 50 (FIG. 4) which is rotatably mounted in the arm 22, the base being driven by a train of gears (not shown) housed in the arm, one of these gears being fixed upon the upper end of a shaft 54 (FIG. 2) which is mounted for rotation within the above-mentioned sleeve 24. A gear 56, fixed upon the lower portion of the shaft 54, is rotated with a variable velocity by a gear 58 under the control of mechanism comprising a fixed cam 60. This mechanism is driven by other gears comprising an idler gear on the shaft 54, like and directly below the gear 56, and meshing with another gear 62 which is driven by a pinion 64. The latter pinion is driven from a motor driven reduction gear unit 66 (FIG. 1). The gear 62 is fixed upon a vertical shaft 68 which is rotatably mounted in the base 26.

In a cycle of operation of the machine, the gear 62 makes one complete revolution during which the arm 22 is swung in the manner stated above by the following connections. A cam 70 (FIG. 2), fixed upon the shaft 68, is engaged by a roll 72 on a bell crank 74 which is pivoted at 76 upon a bracket 78, the latter being fixed upon the base 26. The bell crank is connected by a link 80 to one end of a lever 82 to the other end of which is pivoted a link 84 connecting the lever 82 with an arm 86 which is fixed upon the sleeve 24. The link 84 is urged to the left, causing the roll 72 to be held against the cam 70, by a spring 88 which biases a rod 90 to the right and tensions a chain 92 connecting the rod with the above-mentioned link 84. The right-hand end of the link 84 moves in a path controlled by a link 94 which is pivoted to the link 84 and also to the bracket 78. In the midportion of the lever 82 there is a slot 95 which receives a fulcrum block 96 (FIG. 2), adjustable within the slot so as to vary the relative lengths of the arms of the lever 82, and hence, also vary the amplitude of oscillation of the arm 22.

The structure referred to thus far is substantially similar to the corresponding structure shown in the above-mentioned application to which reference may be made for a more detailed description of these parts. The present invention however is concerned, more particularly, with a novel jack, having provision for locating shoes, regardless of their size, in a predetermined centered position on the jack and, associated therewith, means responsive to the centering movement of the shoe upon the jack for automaticaly setting the fulcrum block 96 so as to cause the amplitude of oscillation of the jack to be appropriate for the size of the work.

Figure 3:
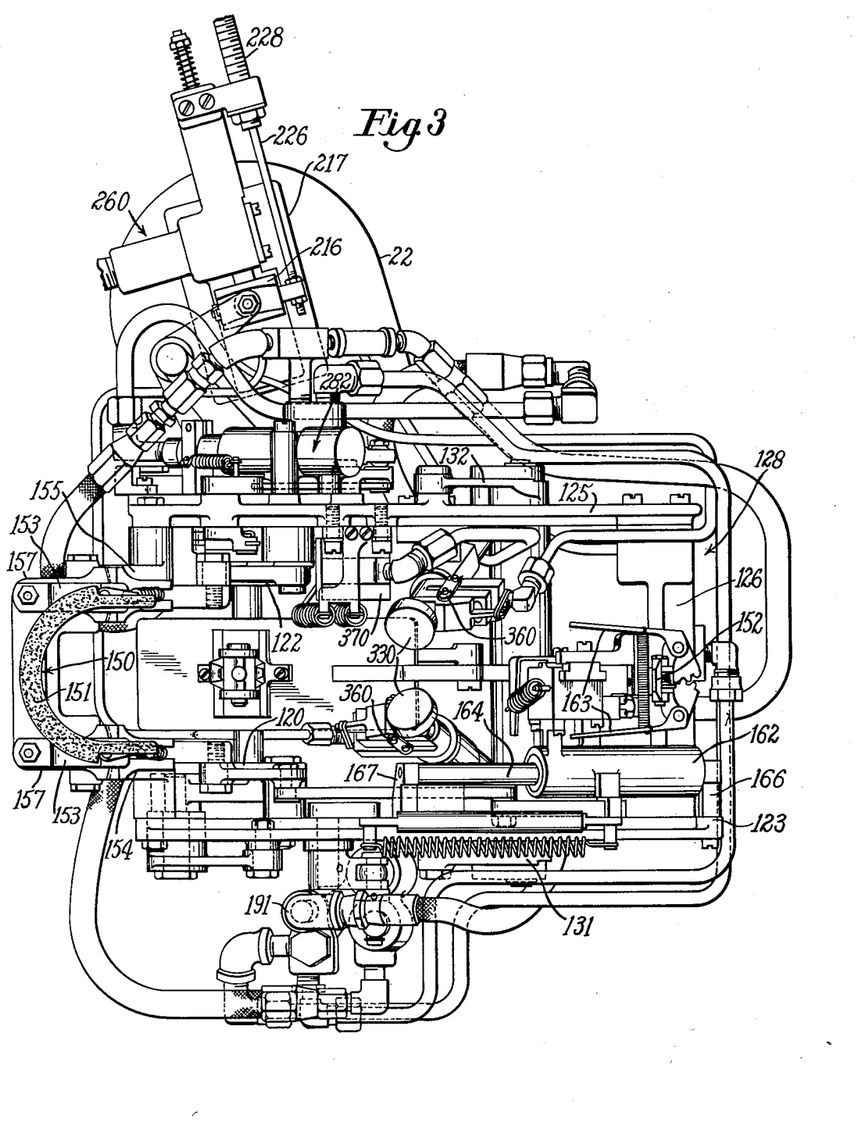
FIG. 3 is a plan view of the jack.
Figure 5:
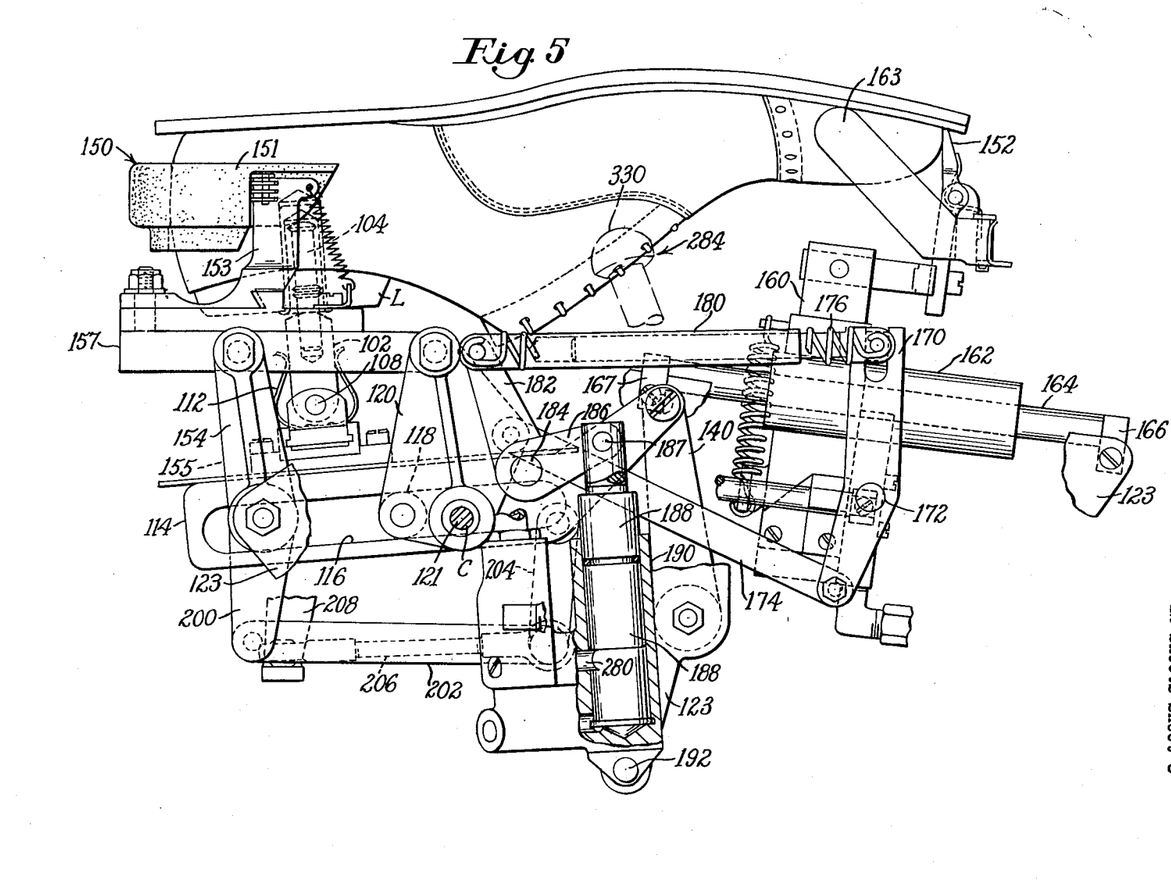
FIG. 5 is a view similar to FIG. 4 with parts broken away and in different positions.
Figure 6:
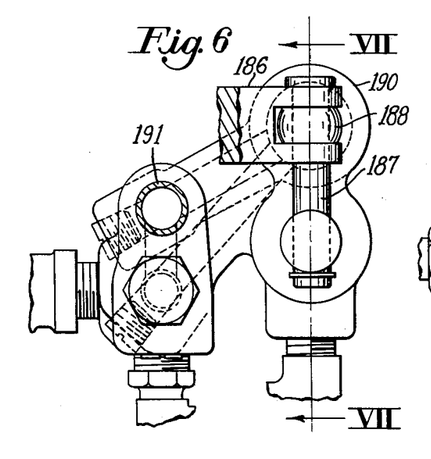
FIG. 6 is a plan view of the gage operating cylinder.
Figure 7:
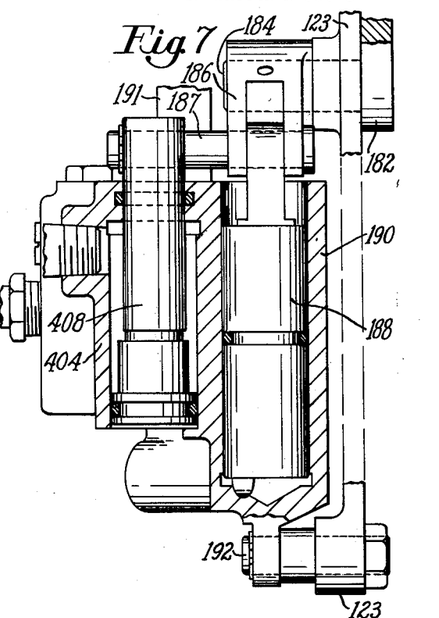
FIG. 7 is a view on line VII—VII of FIG. 6.
Figure 8:
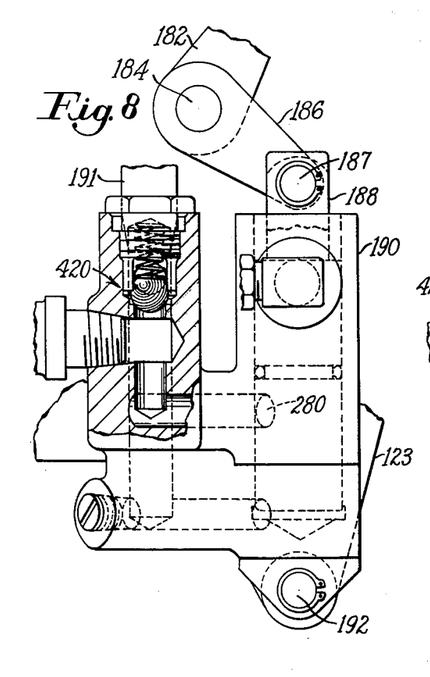
FIG. 8 is a side elevation, partly in section, of the parts shown in FIG. 6.
Figure 9:
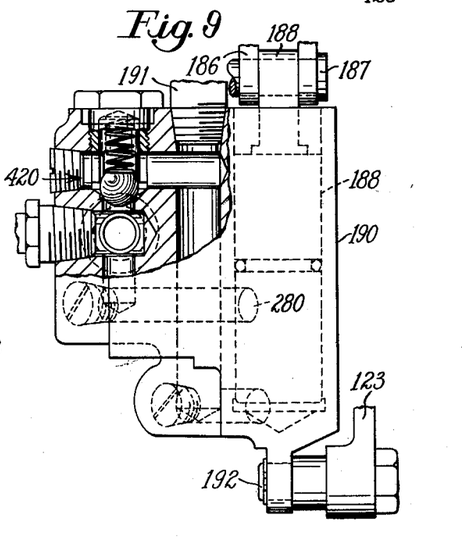
FIG. 9 is right side elevation, partly in section, of the parts as seen in FIG. 8.
Figures 12, 13:
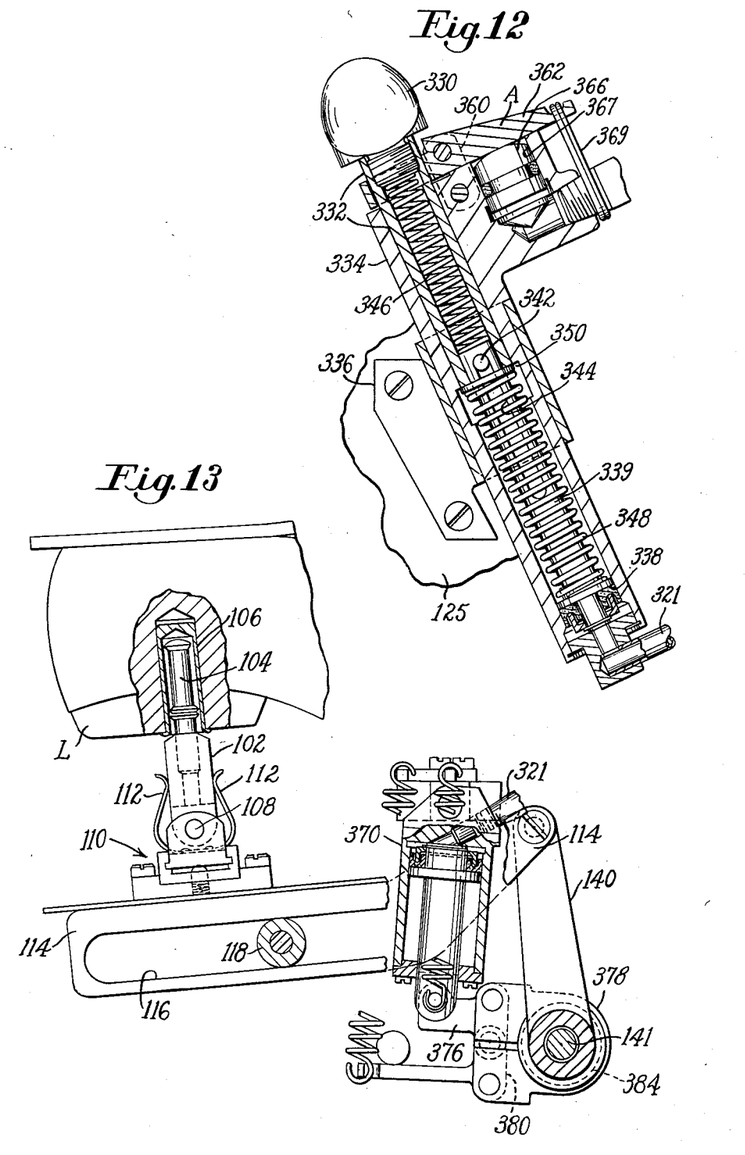
FIG. 12 is a section through one of the forepart support cylinders.
FIG. 13 is a side elevation, partly in section, showing a portion of the heel support mechanism.
Figure 14:
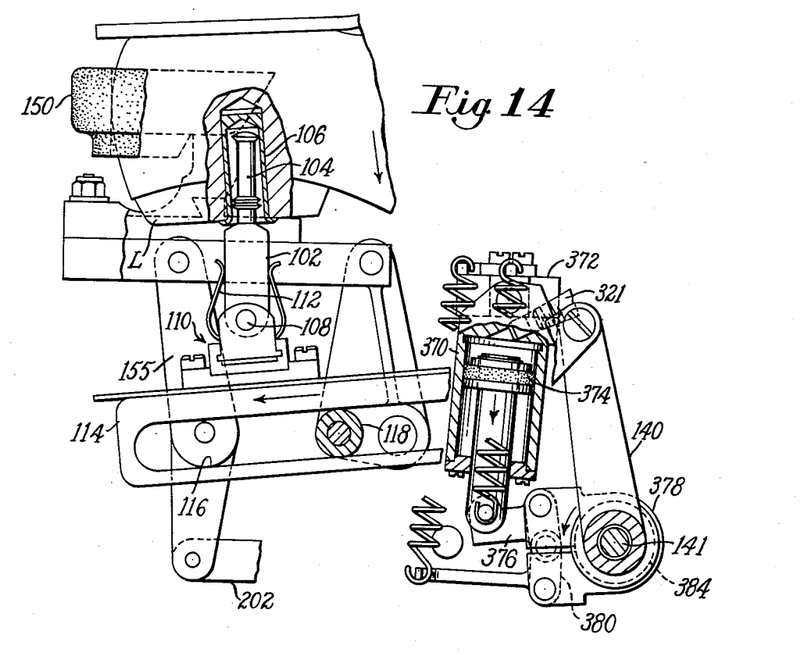
FIG. 14 is a view similar to FIG. 13 but showing the several parts in different positions and with other portions of the heel gage mechanism added.
Figure 15:
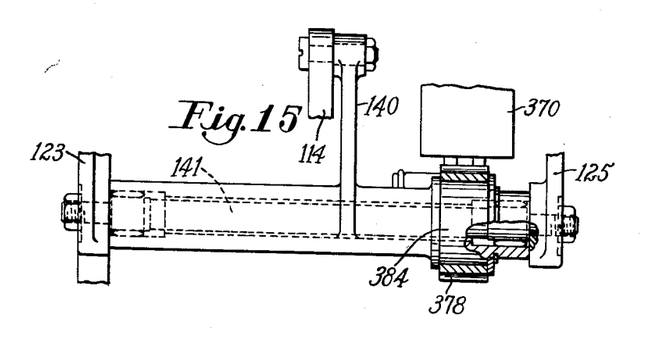
FIG. 15 is a right side elevation of a portion of the mechanism seen in FIG. 14.

To this end a last L carrying a shoe to be operated upon is supported on the jack 12 by a holder 102 (FIGS. 4 and 5) from which there projects upwardly a pin 104 (see also FIGS. 13 and 14) to be received in the usual thimble 106 in the heel part of the last. The holder 102 is pivotally mounted on a pin 108 in a self-adjusting support 110 of usual construction. The support is provided with a pair of opposed leaf springs 112 which engage the holder 102 at opposite sides to maintain the holder in an upright position. The support is mounted on an arm 114 having a slot 116 which receives a transverse sleeve 118. The sleeve is carried at opposite ends in levers 120, 122 (see also FIG. 3), the lever 120 being journaled on a stud 121 carried by a frame plate 123 while the lever 122 is pivotally mounted on a stud 124 (FIG. 18) in a frame plate 125. The frame plates 123, 125 are connected together by suitable struts, such as 126 (FIG. 3) to form a rocking frame 128 which provides a pitching movement to the jack. At the heelward end of the jack the frame plate 123 is connected by an arm 130 to the base 50 as most clearly appears in FIG. 4. At the toeward end of the jack the frame 128 is connected to the base 50 by a pair of arms 131, 132 (see also FIG. 3) journaled in the frame 50. An arm 134 integral with the arms 131, 132 is connected by a link 136 to a rod 138 which is connected to the usual cam driven mechanisms for imparting a pitching movement to the jack. As this cam driven mechanism is disclosed completely in U.S. Patent No. 2,869,156, granted January 20, 1959, in the name of E. W. Stacey and forms no part of the present invention, it will not be further described herein. The disposition of the arms 130, 131 and 132 with respect to the rocking frame 128 and the base frame 50 allows the frame 128 to pitch or rock about a horizontal axis which passes through the midpoint of the bottom of any last on the jack and intersects the axis of rotation of the jack. As seen in FIGS. 5, 13 and 14, the right end of the arm 114 carrying the holder 102 is pivoted to another arm 140 which is journaled at its lower end on a rock shaft 141, fixed at opposite ends in the side frame plates 123, 125.

The holder 102 is positioned lengthwise of the jack by the last L in a shoe which in turn is positioned lengthwise of the jack between a heel gage 150 and a toe gage 152. The gages 150, 152 are movable at the same rate toward and away from each other, the gages always remaining equidistant from the center of rotation of the jack which in this case is the center of rotation of the base 50. The heel gage 150 (FIGS. 3, 4 and 5) comprises a flexible strap 151 carried by a pair of upright arms 153 which are individually pivoted for transverse swinging movements on a frame 157. The frame is mounted on the rocking frame 128 by a parallel linkage which includes the levers 120, 122 and which also includes a pair of levers 154, 155. The levers 120, 154 are pivoted on the frame plate 123 while the levers 122, 155 are pivoted on the frame plate 125. The heel gage 150 is thus mounted for movement on the above described levers in such manner that the gage remains at a predetermined distance below the bottom of a shoe on the jack regardless of the shoe size to avoid interference with the cutter head 10 while the shoe is being operated upon. As the heel gage 150 is moved to the right as seen in FIG. 5, the levers 120, 122 are swung clockwise raising the sleeve 118 in the arm 114. The leverage is so designed that as the heel gage is moved a certain distance depending upon the size of the shoe on the jack, the sleeve 118 and hence also the holder 102, are raised proportionately according to the size of shoe so that the bottom of the heel end of a shoe of any size will always be disposed at the same height on the jack.

The toe gage 152 is mounted on a slide 160 which is movable heightwise in a holder 162 to permit retraction of the toe gage when a shoe is being operated upon. The toe gage is also provided with side wings 163 which are interconnected so as to center the forepart of the shoe with respect to the gage. The holder 162 is mounted to slide lengthwise of the jack upon a rod 164 fixed upon the frame 123 by means of blocks 166, 167. The holder is driven by a slotted lever 170 which is pivoted at 172 on the frame 123. At its lower end the lever 170 is connected by a link 174 to the previously mentioned lever 120 to interconnect the heel gage 150 and the toe gage 152 for equal movements toward and away from each other and relative to the center of rotation of the jack.

The toe and heel gages are normally held apart by a fluid operated mechanism which includes a telescoping link 180 connected at one end to the holder 162 and at the other end to an arm 182 fixed to a rock shaft 184 journaled in the frame plate 123. The rock shaft also has fixed thereto an arm 186 which is connected by a pin 187 to the upper end of a piston 188 (see also FIGS. 6–9). The piston is received in a cylinder 190 pivotally connected at its lower end to the frame plate 123 by a pin 192. The lower end of the piston 188 is initially at the lower end of the cylinder holding the toe and heel gages apart. In placing a shoe in the jack the operator places the thimble 106 of the last on the pin 104 with the last resting on the holder 102 and moves the last and shoe thereon to bring its toe end into engagement with the toe gage 152. Preparatory to bringing the cutter head into engagement with the shoe the operator raises the bottom rest 20 by means of a toggle lever which actuates a switch M1 setting into operation a solenoid operated valve V (FIG. 24) which admits pressure fluid to the cylinder 190 through a conduit 191. The pressure fluid then raises the piston 188 moving the telescoping link 180 to the left as seen in FIG. 5, causing the gages 152, 150 to be moved toward each other until both gages contact the shoe at its opposite ends. In this manner the gages move the shoe until it is positioned with the midpoint of its bottom located substantially on the axis of rotation of the jack.

Figure 2:
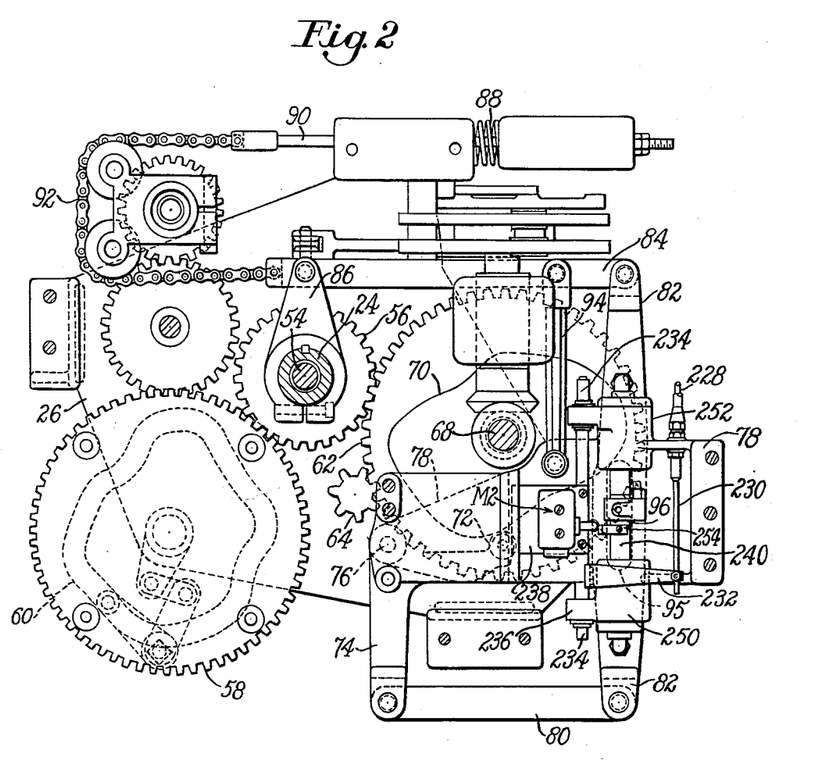
FIG. 2 is a sectional plan view of the jack driving mechanism.
Figures 10, 11:
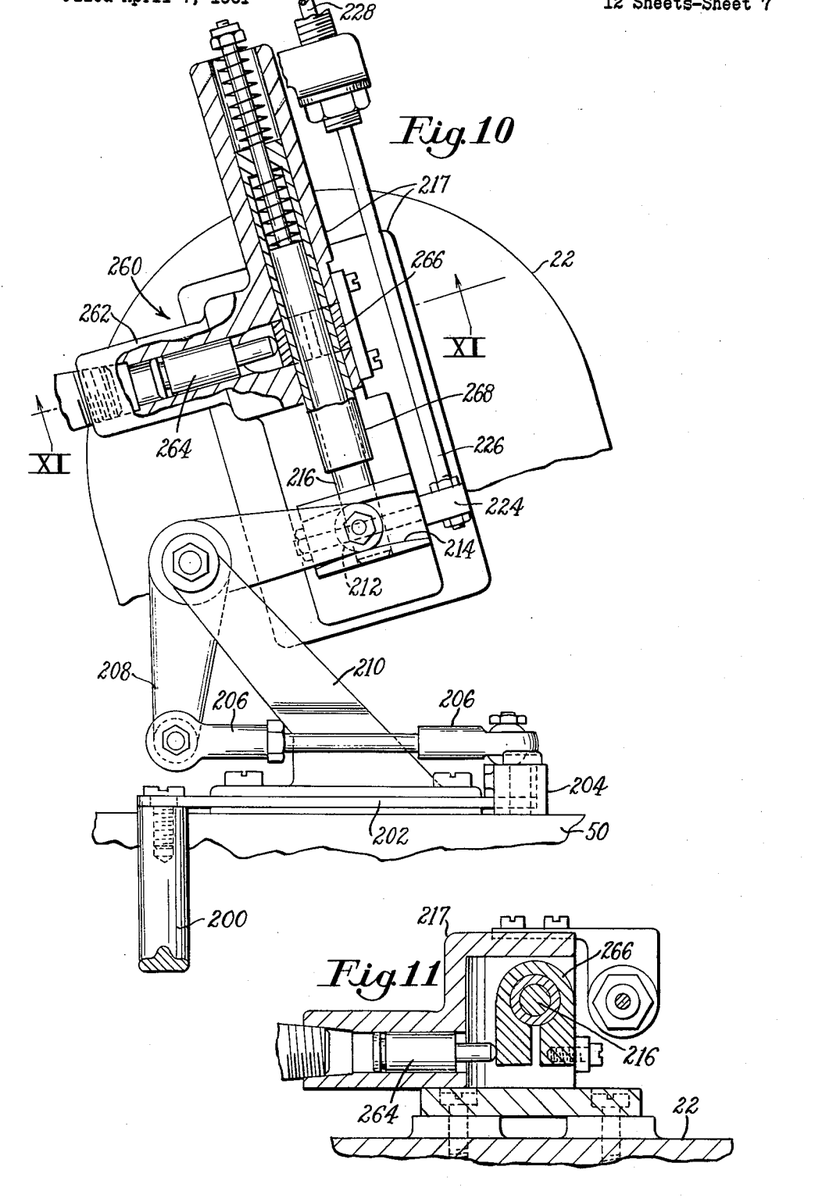
FIG. 10 is a plan view, partly in section, of the size setting mechanism.
FIG. 11 is a section on line XI—XI of FIG. 10.

The closing movements of the heel and toe gages 150, 152 in addition to centering the shoe on the jack also act to measure the length of the shoe according to the movement of the heel gage levers. In response to the measuring action of the heel gage the position of the fulcrum block 96 for the lever 82 in the swing arm driving mechanism is set to provide the proper throw of the jack for the size of shoe thereon. The lever 155 (FIGS. 3, 4 and 14) which is associated with the parallel linkage for the heel gage is provided with a depending arm 200. The arm 200 is connected by a link 202 (FIGS. 5 and 10) to a depending arm 204 pivoted on the frame plate 125, the arm 204 also being connected by an adjustable link 206 to one arm of a bell crank 208 (FIG. 10). The bell crank is pivoted on a bracket 210 secured to the rotating base 50. The other arm of the bell crank is provided with a roll 212 which engages a groove 214 in a slide 216, the slide being mounted for movement in a bracket 217 secured to the swing arm 22. The slide 216 is provided with a lug 224 to which is secured a push rod 226 connected by a Bowden cable 228 to another push rod 230 (FIG. 2). The rod 230 is secured to a bracket 232 carried by a rod 234 mounted for sliding movement in a bracket 236. The rod has fixed thereto a plate 238 which at one side slides in a guideway formed in the bracket 236. The plate has mounted thereon a microswitch M2 which controls the extent of movement of the fulcrum block 96 for the lever 82. Thus, the extent of movement of the heel gage 150 in measuring and centering the shoe, controls through the above mechanism the position of the microswitch M2 and hence also controls the position of the fulcrum 96 relative to the lever 82.

As fully described in the above-mentioned application Serial No. 28,800, the fulcrum block 96 is mounted on a rod 240 the end portions of which form pistons and are received in cylinders 250, 252. At the beginning of a cycle of operation of the machine, fluid pressure is admitted to the cylinder 252 to move the rod 240 and block 96 until a lug 254 on the rod actuates the microswitch M2. The microswitch, as more fully described in the above-mentioned application, controls the operation of a solenoid operated valve (not shown) to prevent any flow of pressure fluid into or out of the cylinders 250, 252. In this manner the fulcrum block 96 is hydraulically locked in a position related to the size of shoe to be operated upon, thus controlling the amplitude of oscillation of the swing arm 22 commensurate with the size of shoe on the jack.

The rotation of the jack relative to the swing arm 22 during the subsequent automatic cycle of the machine causes the roll 212 (FIG. 10) on the bell crank 208 to be disengaged from the groove 214. So that the roll can reenter the groove when the jack returns to its initial position at the end of the operation of the machine, there is provided a fluid operated lock 260 to fix the adjusted position of the slide 216. The lock includes a cylinder 262 formed on the bracket 217, the cylinder receiving a piston 264 which bears against one side of a split ring 266 (FIG. 11). The split ring receives a sleeve 268 which is yieldingly connected to the slide 216, as best seen in FIG. 10. Thus, by admitting pressure fluid to the cylinder 262 after the setting of the fulcrum block 96, the piston 264 exerts a force to tighten the split ring 266 to lock the position of the sleeve 268 and hence also to fix the position of the groove 214 to receive the roll 212 at the end of the machine cycle.

As previously described, upward movement of the piston 188 (FIGS. 5, 8 and 9) causes the gages 150, 152 to be closed against the shoe. The piston 188 is adapted to move through a full stroke which is considerably longer than is necessary to bring the gages into contact with the smallest size of shoe to be operated upon. Overtravel of the piston after the gages contact the shoe is permitted by the telescoping link 180 which is elongated after the gages close against the shoe according to the remaining overtravel of the piston 188. When the piston reaches the upper end of its stroke, a port 280 in the cylinder 190 is uncovered to admit fluid pressure to a heel lock cylinder 282 (FIG. 3) and two forepart support cylinders 334 (see also FIGS. 12 and 24).

When pressure is supplied to the forepart support cylinders 334 (FIG. 12) from the cylinder 190 the forepart support pads 330 are moved upwardly against the shoe under a relatively light pressure so as to avoid displacing the shoe above the toe gage. The forepart supports are identical and each includes a pad 330 carried on the upper end of a sleeve 332 which is mounted for heightwise movement in the cylinder 334 carried by a bracket 336 secured to the frame plate 123 or 125. The cylinder at its lower end receives a piston 338 having an upstanding rod 339 which is slidably received in the sleeve 332. The sleeve and the rod are connected by a pin 342 secured in the sleeve and passing through a slot 344 in the rod. A spring 346 in the sleeve 332 and a spring 348 on the rod 339 maintains the piston and sleeve extended to the limit of the pin and slot connection. Pressure fluid admitted to the lower end of the cylinder 334 from the cylinder 190 moves the support pad 330 up into engagement with the shoe on the jack with the springs 346, 348 allowing yielding engagement with the shoe.

Figure 16:
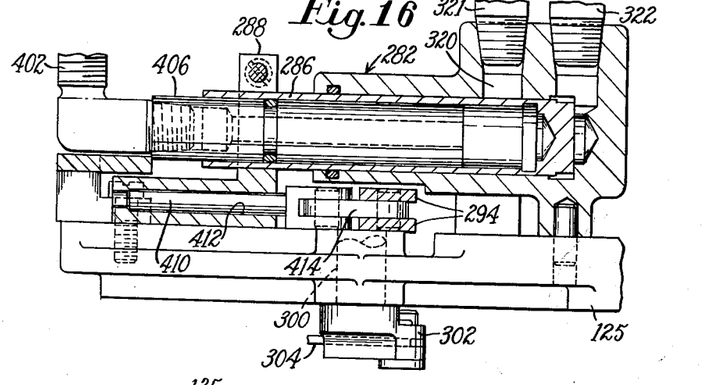
FIG. 16 is a section through a portion of the heel gage locking mechanism.
Figures 17, 18:
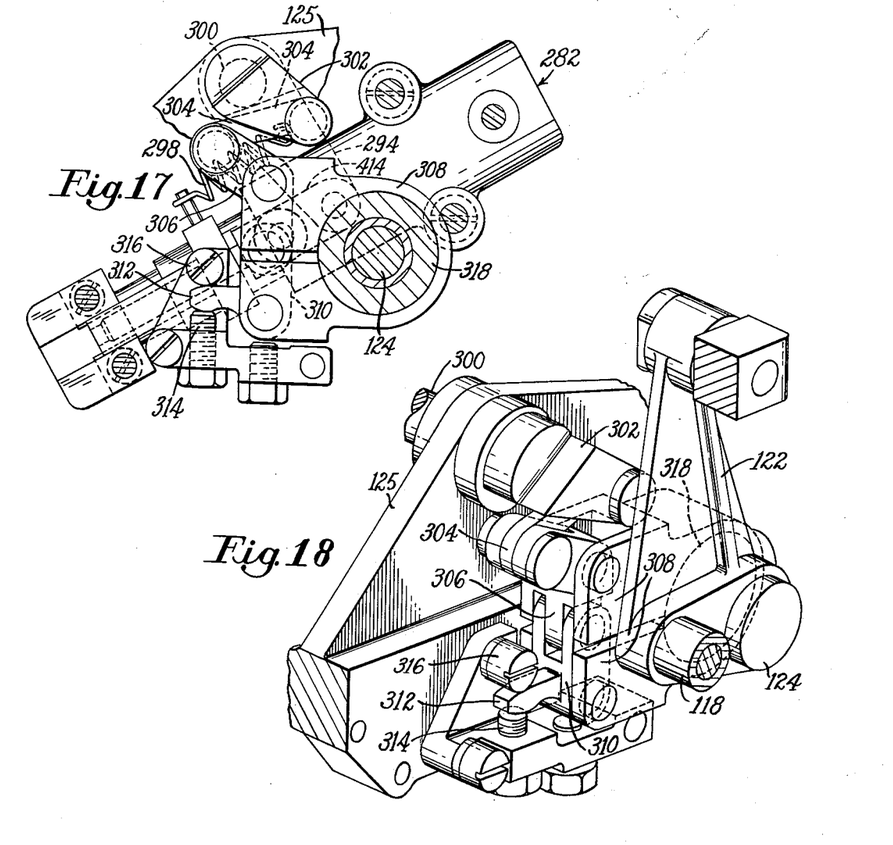
FIG. 17 is a side elevation of the heel gage locking mechanism with portions of the frame removed for clarity.
FIG. 18 is a perspective view of the mechanism seen in FIG. 17.
Figure 19:
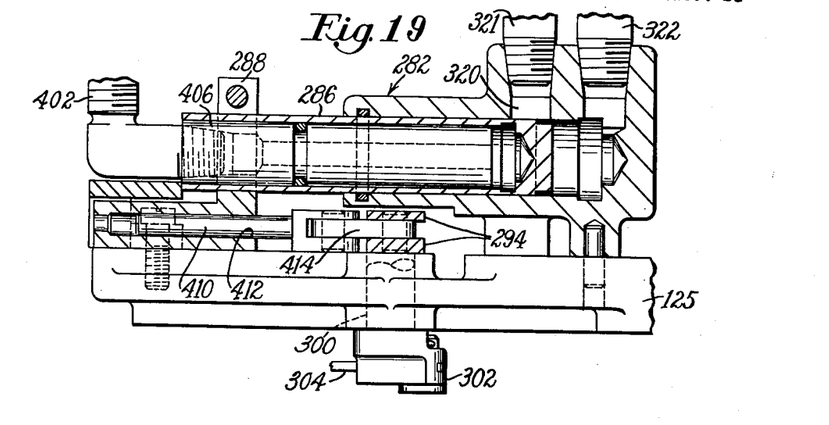
FIGS. 19 and 20 are similar to FIGS. 16 and 17, respectively, with the parts illustrated in different positions.
Figure 20:
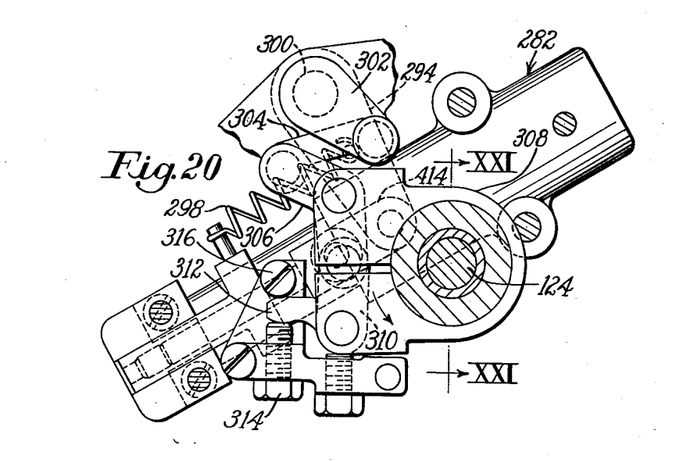
Figure 21:
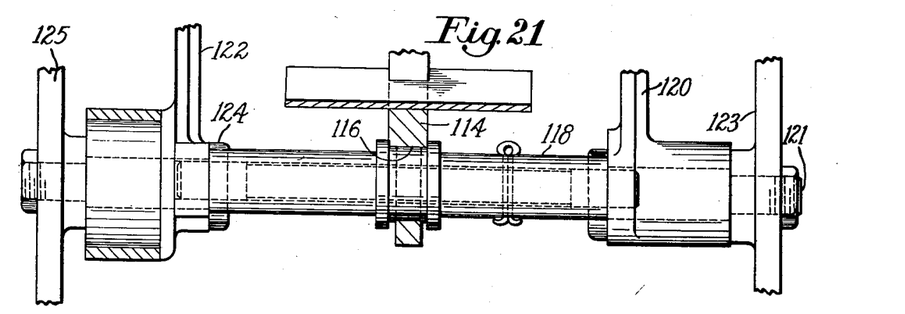
FIG. 21 is a section substantially on line XXI—XXI of FIG. 20.

The heel lock cylinder 282 receives (FIGS. 16 and 19) a piston 286 which has fixed thereto a block 288 connected to an arm 294 by means of a spring 298 (FIGS. 17 and 20). The arm 294 is fixed to a rock shaft 300 journaled in the frame plate 125 and which also has fixed thereto an arm 302 inside the frame plate 125 (see also FIG. 18). The arm 302 is connected by a link 304 to one arm of a bell crank 306 which is pivoted on a split ring 308. The other arm of the bell crank is connected to a link 310 pivoted on another portion of the split ring. The lower arm of the bell crank 306 together with the link 310 form a toggle which when in its straightened condition, as seen in FIG. 17, acts to spread the split ring 308. The link 310 of the toggle is provided with a lug 312 which is held between the end of a screw 314 and a stud 316 so that the lower end of the toggle is restricted in movement. The split ring receives a sleeve 318 formed on the lever 122 which is included in the parallel linkage of the heel gage.

Admission of pressure fluid to the heel lock cylinder 282 moves the piston 286 to the left from the position seen in FIG. 16 to the position seen in FIG. 19 rocking the arms 294, 302, clockwise, breaking the toggle formed by the bell crank 306 and link 310 to allow the split ring 308 to close firmly on the sleeve 318. In this manner the lever 122 and hence also the heel gage 150 is locked against movement. Locking the movement of the arm 122 also fixes the heightwise position of the sleeve 118 thus also fixing the heightwise position of the heel end of the shoe.

The piston 286 has a period of overtravel during which the spring 298 is further extended after causing locking of the heel rest. This overtravel of the piston uncovers a port 320 in the cylinder 282 permitting passage of pressure fluid from the cylinder to a conduit 321 leading to a last locking device to locking devices for fixing the positions of the forepart supports and to a cylinder 392 for retracting the toe gage. The upper end of each cylinder 334 (FIG. 12) supports a locking plate 362 by links 360. At one end the plate 362 is provided with a suitable bore through which passes the sleeve 332. Adjacent its opposite end the plate 362 is engaged on its underside by a piston 366 which is received in a cylinder 367 formed in an extension of the cylinder member 334. Pressure fluid is passed from the cylinder 282 to the cylinder 367 under the piston 366 rocking the plate 362 against the action of a tension spring 369 about the links 360 so that the bore in the plate is angularly displaced and binds on the sleeve 332 to prevent its movement. In this manner the heightwise positions of both forepart supports are fixed.

Pressure fluid is also passed from the cylinder 282 through the conduit 321 to the upper end of a cylinder 370 (FIGS. 13 and 14) which is pivotally mounted at its upper end on a bracket 372 extending from the side frame plate 125. Admission of pressure fluid to the cylinder moves a piston 374 down to rock counterclockwise a bell crank 376. The bell crank 376 is pivotally mounted to one side of a split ring 378 with one arm of the bell crank being connected to a link 380 connected to the other side of the split ring 378 forming a toggle. Rocking the bell crank 376 causes the toggle to be broken (as seen in FIG. 14) allowing the split ring which is self-energizing to close firmly upon a drum 384 integral with the arm 140. Continued movement of the piston 374 causes the split ring and hence also the arm 140 to be rocked heelward moving the arm 114 to the left, as seen in FIG. 14. Since the shoe is held against movement by the previously locked heel gage 150, rearward movement of the arm 114 causes the holder 102 to be rocked clockwise about its pivot cramping the pin 104 within the last thimble 106 to prevent relative movement between the holder 102 and the last. In this manner the last with the shoe thereon is not only locked on the jack but the forepart of the shoe is also forced down firmly against the previously locked forepart support pads 330.

Pressure fluid is also directed from the piston 282 through the conduit 321 to move the toe gage 152 downwardly to avoid interference with the cutter head 10. To this end the slide 160 is mounted for heightwise movement in guideways 390 (FIGS. 22 and 23) in the holder 162. Adjacent the guideway 390 there is formed a cylinder 392 which receives a piston 394. The lower end of the piston is connected to the slide 160 by a pin 396 so that movement of the piston 394 is also transmitted to the slide 160 and toe gage 152. Pressure fluid is admitted to the upper end of the cylinder 392 from the cylinder 282 moving the piston 394 and hence also the toe gage downwardly against the action of a spring 398.

The above sequence of operations during which a shoe is centered and locked on the jack and the fulcrum block 96 is set was initiated, as previously discussed, by the operator raising the bottom rest 20 of the cutter head causing actuation of the switch M1. After this sequence of operations, the operator engages the cutter head with the shoe and depresses a switch M3 to initiate the automatic cycle of the machine. This causes the jack to be oscillated back and forth by the swing arm 22 in a predetermined sequence but at an amplitude depending on the size of shoe on the jack as determined by the setting of the fulcrum block 96. At the same time the jack is rotated on the swing arm so as to present the entire periphery of the shoe progressively to the cutter. The mechanisms for oscillating the swing arm and rotating the jack are fully described in the above noted patent and patent application.

At the end of the above cycle of operations of the machine, a lobe on a cam 400 (FIG. 1) actuates a microswitch M4 which causes retraction of the cutter head from the work. Other switches (not shown) are actuated upon return of the cutter head to its retracted position to cause the solenoid operated valve V (FIG. 24) to return to its initial position. In this position of the valve, pressure fluid exhausts through the valve from the conduit 191 while a conduit 402 conducts pressure fluid from the valve to a cylinder 404 (see also FIG. 7) and to a fixed piston 406 (see also FIG. 16) slidably received within a bore in the piston 286. Admission of pressure to the cylinder 404 moves a piston 408 down. This piston is connected to the arm 186 and piston 188 by the pin 187 so that the gages 150, 152 are retracted at this time. Admission of pressure fluid through the fixed piston 406 moves the piston 286 to the right from the position seen in FIG. 19 to that seen in FIG. 16. During this piston movement a rod 410 bottoms against a shoulder in a bore 412 in the block 288 and moves therewith to the right. The rod is connected by a link 414 to the lower end of the arm 294 so that the arm 294 and hence also the arm 302 are swung counterclockwise causing the toggle formed by the bell crank 306 and link 310 to be straightened opening the split ring 308. In this manner the arm 122 is unlocked to release the heel gage 150 for movement.

Figures 22, 23, 24:
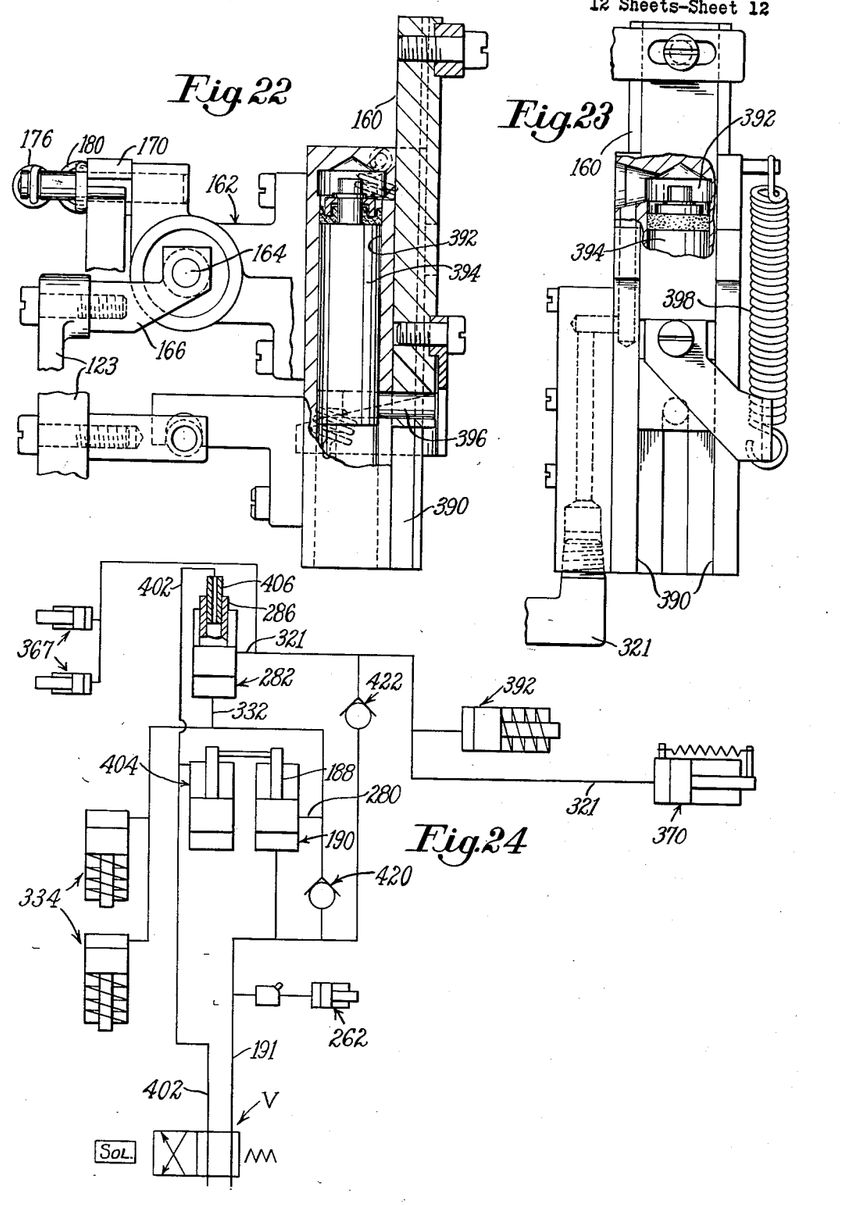
FIG. 22 is an elevation illustrating the toe gage mechanism with parts broken away.
FIG. 23 is a right side elevation of the mechanism shown in FIG. 22.
FIG. 24 is a diagrammatic view illustrating the fluid pressure system for operating the jack.

Exhausting of pressure from the conduit 191 exhausts the cylinder 282 (FIG. 16) and the cylinders 334 (FIG. 12) permitting return of the heel lock piston 286 as described above and retraction of the forepart support pistons 338 until the piston 188 closes the port 280. These cylinders thereafter exhaust through a ball check valve 420 (FIG. 24). The forepart support lock cylinders 367 (FIG. 12), the toe gage retracting cylinder 392 (FIG. 22) and the last locking cylinder 370 (FIG. 13) are exhausted through the cylinder 282 until the port 320 therein is closed by return of the piston 286. These cylinders thereafter are exhausted through a ball check valve 422 (FIG. 24). In the above described manner the last and shoe thereon are released and all parts of the jack are returned to their initial positions permitting removal of the shoe and replacement with another shoe to be operated upon.

Having thus described my invention, what I claim as new and desire to secure by Letters Patent of the United States is:

1. In a shoe machine, a jack for holding a shoe for rotation about an axis substantially normal to the shoe bottom, shoe positioning gages equidistant from said axis and engageable with opposite ends of the shoe, means mounting said gages on the jack for equal and opposite relative movements lengthwise of the shoe, and means for moving said gages into engagement with the ends of the shoe for centering the shoe with respect to said axis.

2. In a shoe machine, a jack for holding a shoe for rotation about an axis substantially normal to the shoe bottom, shoe positioning gages equidistant from said axis and engageable with opposite ends of the shoe, means mounting said gages on the jack for equal and opposite relative movements lengthwise of the shoe, and means for moving said gages into engagement with the ends of the shoe for centering the shoe with respect to said axis, and for measuring the length of shoe according to the extent of movement of said gages.

3. In a shoe machine, a jack for holding a shoe for rotation about an axis substantially normal to the shoe bottom, a toe gage, a heel gage, means mounting said gages for movement lengthwise of a shoe on the jack, means interconnecting said gages for equal and opposite relative movements which maintain the gages equidistant from said axis and mechanism for moving said gages into engagement with the ends of the shoe for centering the shoe with respect to said axis.

4. In a shoe machine, a jack for holding a shoe for rotation about an axis substantially normal to the shoe bottom, shoe positioning gages equidistant from said axis and engageable with opposite ends of the shoe, means mounting said gages on the jack for equal and opposite relative movements, means for moving said gages into engagement with the ends of the shoe for centering the shoe with respect to said axis and for measuring the length of shoe according to the extent of movement of said gages, a shoe support mounted on the jack for movement heightwise of the shoe, and means for moving the support heightwise in proportion to the measuring movement of said gages whereby as the shoe is centered with respect to the axis of rotation, the shoe length is also measured by the extent of movement of the gages and the shoe support is moved heightwise proportionately to the shoe length to locate the shoe bottom at a predetermined height.

5. In a shoe machine, a jack for holding a shoe for rotation about an axis substantially normal to the shoe bottom, a toe gage, a heel gage, means mounting said gages for movement lengthwise of a shoe on the jack, means interconnecting said gages for equal and opposite relative movements which maintain the gages equidistant from said axis, mechanism for moving said gages into engagement with the ends of the shoe for centering the shoe with respect to said axis and for measuring its length by the extent of movement of said gages, a shoe support having a pin engageable in the thimble of a last in the shoe, means mounting the support on the jack for lengthwise movement with the shoe as it is centered by the gages, and means operated by said mechanism for moving the support heightwise at a predetermined ratio to the lengthwise measuring movement of said gages whereby the shoe is positioned at a predetermined height on the jack.

6. In a shoe machine, a jack for holding an inverted shoe for rotation about an axis substantially normal to the shoe bottom, a toe gage for locating the toe end of the shoe at a predetermined height on the jack, a heel end support mounted on the jack for heightwise movement, a heel gage, means mounting the toe gage and the heel gage on the jack for simultaneous equal and opposite relative movements lengthwise of the shoe with the gages remaining equidistant from said axis, mechanism for moving said gages into engagement with the ends of said shoe for centering the shoe with respect to said axis and for measuring the shoe length by the extent of movement of said gages, and means for moving the heel end support heightwise in proportion to the measuring movement of said gages to level the bottom of the shoe at a predetermined height on the jack.

7. In a shoe machine, a jack for holding an inverted shoe for rotation about an axis substantially normal to the shoe bottom, a toe gage for locating the toe end of the shoe at a predetermined height on the jack, a heel end support mounted on the jack for heightwise movement, a heel gage, means mounting the toe gage and the heel gage on the jack for simultaneous equal and opposite relative movements lengthwise of the shoe with the gages remaining equidistant from said axis, mechanism for moving said gages into engagement with the ends of said shoe for centering the shoe with respect to said axis and for measuring the shoe length by the extent of movement of said gages, means for moving the heel end support heightwise in proportion to the measuring movement of said gages to level the bottom of the shoe at a predetermined height, forepart support means movable heightwise into engagement with the shoe after the shoe has been centered and its bottom leveled, and means for thereafter locking said mechanism and said forepart support means for fixing the heel gage and the forepart support means in the positions determined by engagement with the shoe.

8. In a shoe machine, a jack for holding an inverted shoe for rotation about an axis substantially normal to the shoe bottom, a toe gage for locating the toe end of the shoe at a predetermined height on the jack, a heel end support mounted on the jack for heightwise movement, a heel gage, means mounting the toe gage and the heel gage on the jack for simultaneous equal and opposite relative movements lengthwise of the shoe with the gages remaining equidistant from said axis, mechanism for moving said gages into engagement with the ends of said shoe for centering the shoe with respect to said axis and for measuring the shoe length by the extent of movement of said gages, means for moving the heel end support heightwise in proportional response to the measuring movement of said gages to level the bottom of the shoe at a predetermined height on the jack, forepart support means movable heightwise into engagement with the shoe after the shoe has been centered and its bottom leveled, means for thereafter locking said mechanism and said forepart support means for fixing the heel gage and the forepart support means in the positions determined by engagement with the shoe, means for fixing the shoe on the jack by biasing the heel end support to cramp the shoe against the heel gage and the forepart support means, and means for withdrawing the toe gage after the shoe is fixed.

9. In a shoe machine, a jack for holding an inverted shoe for rotation about an axis substantially normal to the shoe bottom, a toe gage for locating the toe end of a shoe at a predetermined height on the jack, a heel gage, means mounting the toe gage and the heel gage on the jack for simultaneous equal and opposite relative movements lengthwise of the shoe with the gages remaining equidistant from said axis, mechanism for moving said gages into engagement with the ends of said shoe for centering the shoe with respect to said axis and for measuring the shoe length by the extent of movement of said gages, a heel end support having a pin engageable in the thimble of a last in the shoe, means mounting the support on the jack for lengthwise movement with the shoe as it is centered by the gages, means for moving the heel end support heightwise in proportional response to the measuring movement of said gages to level the bottom of the shoe at a predetermined height on the jack, forepart support means movable heightwise into engagement with the shoe after the shoe has been centered and its bottom leveled, means for locking the heel gage and the forepart support means in the positions determined by engagement with the shoe, and means for thereafter biasing the heel end support toward the heel gage to cramp the shoe against the heel gage causing the shoe to be rocked on said support to cramp the forepart of the shoe against the forepart support means thereby fixing the shoe on the jack, and means for withdrawing the toe gage after the shoe is fixed on the jack.

10. In a shoe machine having an operating head and a jack for holding a shoe to be operated upon, said jack being rotated about an axis and moved bodily in a path of variable stroke to present the periphery of a shoe progressively to said head, adjustable driving means for moving the jack in said path with a stroke variable according to the size of shoe on the jack, shoe positioning gages equidistant from said axis and mounted on the jack for equal and opposite relative movements lengthwise of the shoe, mechanism for moving the gages into engagement with the opposite ends of the shoe to center the shoe with respect to said axis and to measure its length by the extent of movement of said gages, and means operated by said mechanism for adjusting said driving means according to the measured length of the shoe.

11. In a shoe machine having an operating head and a jack for holding a shoe to be operated upon, said jack being rotated about an axis and moved bodily in a path of variable stroke to present the periphery of a shoe progressively to said head, adjustable driving means for moving the jack in said path with a stroke variable according to the size of shoe on the jack, a toe gage for locating the toe end of a shoe at a predetermined height on the jack, a heel gage, means mounting the toe gage and the heel gage on the jack for simultaneous equal and opposite relative movements lengthwise of the shoe with the gages remaining equidistant from said axis, mechanism for moving said gages into engagement with the ends of said shoe for centering the shoe with respect to said axis and for measuring the shoe length by the extent of movement of said gages, means operated by said mechanism for adjusting said driving means according to the measured length of the shoe, a heel end support having a pin engageable in the thimble of a last in the shoe, means mounting the support on the jack for lengthwise movement with the shoe as it is centered by the gages, means for moving the heel end support heightwise in proportional response to the measuring movement of said gages to level the bottom of the shoe at a predetermined height on the jack, forepart support means movable heightwise into engagement with the shoe after the shoe has been centered and its bottom leveled, means for locking the heel gage and the forepart support means in the positions determined by engagement with the shoe, and means for thereafter biasing the heel end support toward the heel gage to cramp the shoe against the heel gage causing the shoe to be rocked on said support to cramp the forepart of the shoe against the forepart support means thereby fixing the shoe on the jack, and means for withdrawing the toe gage after the shoe is fixed on the jack to avoid interference with the operating head.

References Cited in the file of this patent

UNITED STATES PATENTS

| | | |
|---|---|---|
| 1,968,256 | Morrill | July 31, 1934 |
| 2,264,416 | Topham | Dec. 2, 1941 |
| 2,406,306 | Morrill | Aug. 20, 1946 |
| 2,869,156 | Stacey | Jan. 20, 1959 |